(12) United States Patent
Kodaira (10) Patent No.: US 7,454,842 B2
(45) Date of Patent: Nov. 25, 2008

(54) LASER SURVEYING APPARATUS

(75) Inventor: Junichi Kodaira, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 212 days.

(21) Appl. No.: 11/545,472

(22) Filed: Oct. 11, 2006

(65) Prior Publication Data

US 2007/0089309 A1    Apr. 26, 2007

(30) Foreign Application Priority Data

Oct. 25, 2005    (JP) .............................. 2005-309526

(51) Int. Cl.
*G01C 5/00* (2006.01)
(52) U.S. Cl. ..................................... 33/290
(58) Field of Classification Search ........... 33/290–292, 33/365, 391, 397, 401, 227; 702/150–151, 702/154

See application file for complete search history.

(56) References Cited

U.S. PATENT DOCUMENTS 6,848,188 B2 * 2/2005 Tacklind et al. ............... 33/290
7,360,314 B2 * 4/2008 Haijima et al. ................ 33/290
2008/0110037 A1 * 5/2008 Hayase et al. ................. 33/290

FOREIGN PATENT DOCUMENTS

JP        06-026861 A     2/1994

* cited by examiner

*Primary Examiner*—Yaritza Guadalupe-McCall
(74) *Attorney, Agent, or Firm*—Foley & Lardner LLP (57) ABSTRACT

A laser surveying apparatus includes: a laser light source configured to emit a laser light flux; a laser projector supported tiltably and configured to rotatably irradiate the laser light flux emitted from the laser light source; a mechanism tiltably supporting the laser projector; tilting arms extending in an X-direction and a Y-direction substantially perpendicular to the laser projector; a tilt driving section provided to at least one of the tilting arms configured to drive corresponding at least one of the tilting arms; detectors provided to each of the tilting arms and each configured to detect a movement amount of the corresponding one of the tilting arms, and an arithmetic section configured to calculate an inclination of the laser projector in the X-direction and the Y-direction from each of the movement amounts of the tilting arms detected by the corresponding detectors.

15 Claims, 5 Drawing Sheets

LASER SURVEYING APPARATUS

BACKGROUND

The present invention relates to a surveying apparatus. More particularly, the present invention relates to an improvement in a surveying apparatus in which a laser projector is supported by a gimbal mechanism so as to tilt the laser projector.

Figure 8:
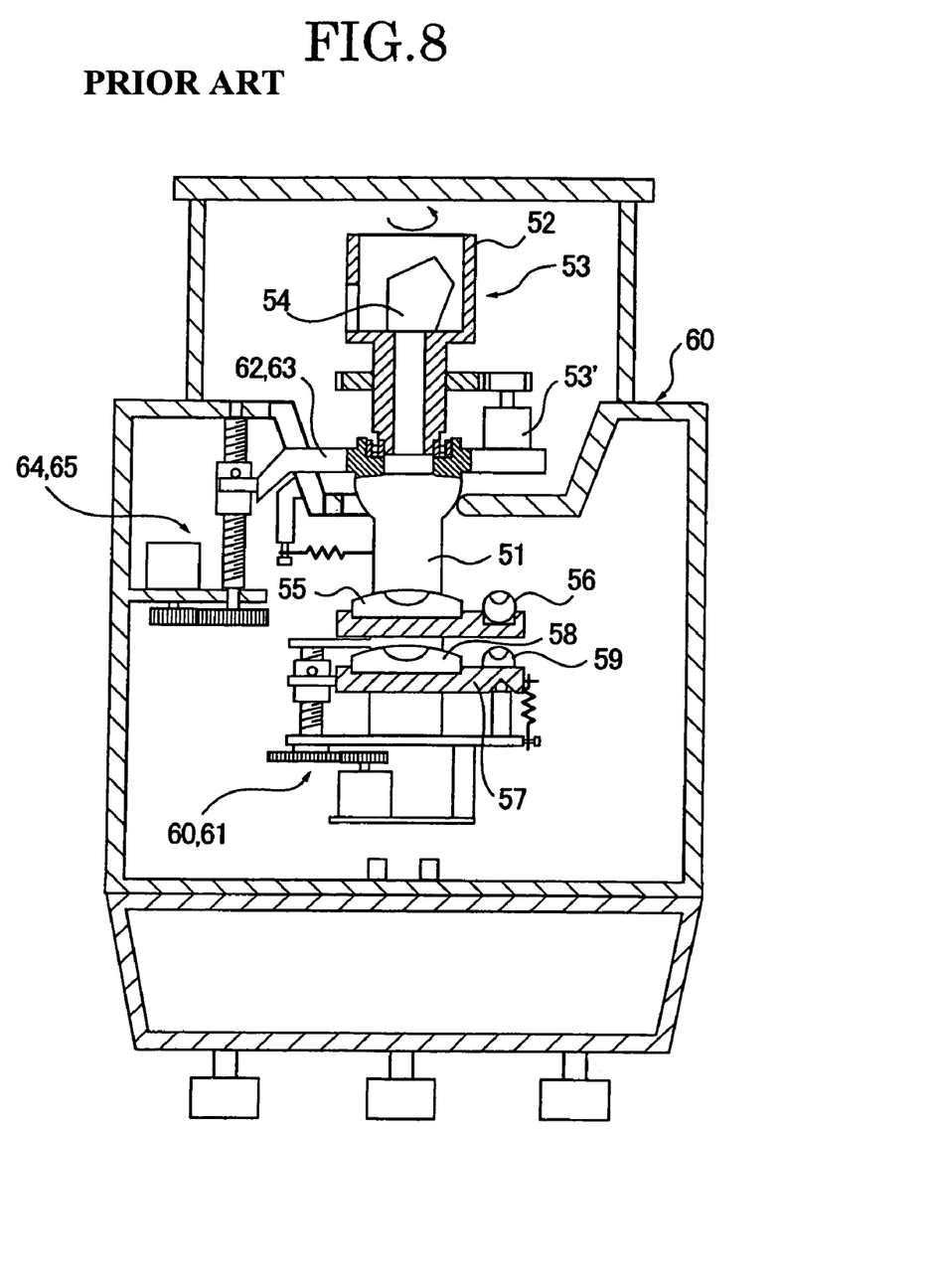
FIG. 8 illustrates a main structure of a conventional laser surveying apparatus.

In a conventional laser surveying apparatus, such as the laser surveying apparatus disclosed in JP-H06-26861A for example, a perforated concave portion having a hemispherical configuration is formed in the center of a casing 50, and a laser projector 51 which emits a laser beam is tiltably engaged freely and supported by the concave portion.

A head of the laser projector 51 is provided with a prism supporting body 52 which rotates around the center of axle of the laser projector 51. A scan gear is fitted to the prism supporting body 52, so that the prism supporting body 52 is adapted to rotate around the center of axle of the laser projector 51 by a scan motor 53' through the scan gear. Thus, the prism supporting body 52 and the scan gear structure a rotation section 53.

The prism supporting body 52 is also provided with a pentaprism 54. The pentaprism 54 orthogonally deflects the laser beam emitted from a direction of the center of axle of the laser projector 51 so as to project the laser beam in a horizontal direction.

In a midway part of the laser projector 51 protruded from the concave portion, a fixed bubble tube 55 and a fixed bubble tube 56, structuring an inclination detector for detecting an inclination of the laser projector 51, are provided orthogonally to each other in such a manner as to be perpendicular to the center of axle of the laser projector 51, to detect verticality of the laser projector 51.

A lower end part of the laser projector 51 is provided with a base plate 57 provided tiltably in a direction perpendicular to the laser projector 51. An arbitrary angle setting bubble tube 58 and an arbitrary angle setting bubble tube 59, both adapted to detect the inclination of the laser projector 51, are provided on the base plate 57.

The base plate 57 is tilted by an arbitrary angle setting driving section 60 and an arbitrary angle setting driving section 61. Note that a tilting direction of the base plate 57 and directions to which the arbitrary angle setting bubble tubes 58 and 59 are provided correspond to a tilting direction of the laser projector 51.

Tilting arm 62 and tilting arm 63 for tilting the laser projector 51 are protruded and extended from the laser projector 51 orthogonally in a horizontal direction, respectively. The tilting arms 62 and 63 are engaged with tilt driving sections 64 and 65 through engagement pins, respectively.

Now, leveling for setting the laser projector 51 vertically in accordance with the conventional laser surveying apparatus will be described.

The tilt driving sections 64 and 65 are driven until each of the fixed bubble tubes 55 and 56 detects horizontality based on a result of detection of each of the fixed bubble tubes 55 and 56, so as to compensate the inclination of the laser projector 51. When the fixed bubble tubes 55 and 56 have detected the horizontality, the center of axle of the laser projector 51 is leveled vertically.

Next, inclination setting for freely tilting the laser projector 51 in arbitrary directions in accordance with the conventional laser surveying apparatus will be described. At first, setting of the inclination of the laser projector 51 in an X-direction or a first direction will be explained.

The arbitrary angle setting driving section 60 is actuated to tilt the base plate 57 in the X-direction or the first direction at an arbitrary angle. The arbitrary angle setting driving section 60 is used to set a predetermined angle of inclination of the laser projector 51 based on the number of drive pulses. Then, the tilt driving section 64 is actuated based on a result of detection of the arbitrary angle setting bubble tube 58 until the tilted arbitrary angle setting bubble tube 58, provided in the X-direction, detects the horizontality, so as to tilt the laser projector 51. When the arbitrary angle setting bubble tube 58 has detected the horizontality, the laser projector 51 is set at the predetermined angle of inclination.

Furthermore, the other arbitrary angle setting driving section 61, the arbitrary angle setting bubble tube 59 and the tilt driving section 65, which are perpendicular to the arbitrary angle setting driving section 60, the arbitrary angle setting bubble tube 58 and the tilt driving section 64, respectively, are similarly activated to detect the horizontality in a Y-direction or a second direction. Thereby, the inclination setting of the laser projector 51 in two directions is possible.

However, because the conventional laser surveying apparatus including the laser surveying apparatus disclosed in JP-H06-26861A employs a pivot structure in which the laser projector or a laser projecting section is supported by the hemispherical concave portion, there is a problem that, although it has the reduced play, a wide range of inclination of the laser projector cannot be obtained structurally.

In addition, there has been also known a laser surveying apparatus which employs a structure in which a laser projector is supported by a gimbal mechanism and a tilting mechanism is utilized to tilt the laser projector. In the conventional laser surveying apparatus utilizing the gimbal mechanism, however, it cannot prevent generation of the play in a bearing part of the gimbal mechanism. Therefore, the conventional laser surveying apparatus utilizing the gimbal mechanism is not suitable for the purpose requiring a precise angle of tilt of the laser projector.

SUMMARY

At least one objective of the present invention is to provide a laser surveying apparatus capable of setting a tilt angle of a laser projector precisely, even when a structure having the play is employed.

To achieve these and other advantages and in accordance with the purpose of the invention, as embodied and broadly described herein, the invention provides a laser surveying apparatus, comprising: a laser light source configured to emit a laser light flux; a laser projector supported tiltably and configured to rotatably irradiate the laser light flux emitted from the laser light source; a mechanism tiltably supporting the laser projector; tilting arms extending in an X-direction and a Y-direction substantially perpendicular to the laser projector; a tilt driving section provided to at least one of the tilting arms configured to drive corresponding at least one of the tilting arms; detectors provided to each of the tilting arms and each configured to detect a movement amount of the corresponding one of the tilting arms, and an arithmetic section configured to calculate an inclination of the laser projector in the X-direction and the Y-direction from each of the movement amounts of the tilting arms detected by the corresponding detectors.

In accordance with an embodiment of the invention, each of the detectors is configured to detect the movement amount of the corresponding one of the tilting arms by detecting a movement amount of the tilt driving section engaged with the at least one of the tilting arms.

In accordance with an embodiment of the invention, the mechanism comprises a gimbal mechanism configured to tiltably support the laser projector, and the arithmetic section is configured to detect an error caused by play of the gimbal mechanism from the movement amount of each of the tilting arms detected by the corresponding detectors.

In accordance with an embodiment of the invention, the mechanism comprises a gimbal mechanism configured to tiltably support the laser projector, and the laser surveying apparatus further comprises: a first pair of shafts each extending in directions opposite to each other in one of the X-direction and the Y-direction and configured to rotatably support a body of the gimbal mechanism, and a second pair of shafts each extending in directions opposite to each other in the other of the X-direction and the Y-direction, and an intersection point of an axis line connecting each of the shafts of the first pair of shafts and an axis line connecting each of the shafts of the second pair of shafts is a center of tilt of the laser projector.

In accordance with an embodiment of the invention, the tilt driving section is provided to each of the tilting arms, and each of the tilt driving sections comprises: a drive motor; a rod screw driven by the drive motor; and a slider engaged with the corresponding one of the tilting arms and configured to reciprocate by the rod screw in a direction to which the rod screw extends.

In accordance with an embodiment of the invention, each of the detectors faces corresponding one of the sliders of the tilt driving sections and comprises a linear detector configured to optically detect a movement amount of the corresponding one of the sliders.

In accordance with an embodiment of the invention, the arithmetic section is configured to calculate a tilt angle from a horizontal plane of the laser projector based on the movement amount from a reference position of each of the sliders and distances from a center of tilt of the laser projector to each of the rod screws.

In accordance with an embodiment of the invention, each of the detectors faces an end of the corresponding one of the tilting arms and comprises a linear detector configured to optically detect the movement amount of the corresponding one of the tilting arms.

In accordance with an embodiment of the invention, the second pair of shafts is protruded from the laser projector.

In addition, the present invention provides another a laser surveying apparatus, comprising: a laser light source configured to emit a laser light flux; a laser projector supported tiltably and configured to rotatably irradiate the laser light flux emitted from the laser light source to form a rotation reference plane; a gimbal mechanism having a frame body and configured to tiltably support the laser projector in an X-direction and a Y-direction perpendicular to each other; a casing accommodating therein the gimbal mechanism; a first pair of shafts each extending from the frame body of the gimbal mechanism to the casing in directions opposite to each other in one of the X-direction and the Y-direction and configured to rotatably support the frame body of the gimbal mechanism, and a second pair of shafts each extending from the frame body of the gimbal mechanism in directions opposite to each other in the other of the X-direction and the Y-direction and configured to support the laser projector, a tilting mechanism provided in the casing and configured to tilt the laser projector; and an arithmetic section configured to calculate a tilt angle of the laser projector, the tilting mechanism including: a first pair of tilting arms each extending in directions opposite to each other in the X-direction from the laser projector; a second pair of tilting arms each extending in directions opposite to each other in the Y-direction from the laser projector; first tilt driving sections each configured to drive corresponding one of the tilting arms of the first pair of tilting arms; second tilt driving sections each configured to drive corresponding one of the tilting arms of the second pair of tilting arms; first detectors each configured to detect a tilt amount of the corresponding one of the tilting arms of the first pair of tilting arms; and second detectors each configured to detect a tilt amount of the corresponding one of the tilting arms of the second pair of tilting arms, the arithmetic section being configured to calculate the tilt angle of the laser projector according to an output of detection of the tilt amount of each of the first detectors and the second detectors.

In accordance with an embodiment of the invention, an intersection point of an axis line connecting each of the shafts of the first pair of shafts and an axis line connecting each of the shafts of the second pair of shafts is a center of tilt of the laser projector.

In accordance with an embodiment of the invention, each of the tilt driving sections comprises: a drive motor; a rod screw driven by the drive motor; and a slider engaged with the corresponding one of the tilting arms and configured to reciprocate by the rod screw in a direction to which the rod screw extends.

In accordance with an embodiment of the invention, each of the detectors faces the corresponding one of the sliders of the tilt driving sections and comprises a linear detector configured to optically detect a movement amount of the corresponding one of the sliders.

In accordance with an embodiment of the invention, the arithmetic section is configured to calculate the tilt angle from a horizontal plane of the laser projector based on the movement amount from a reference position of each of the sliders and distances from a center of tilt of the laser projector to each of the rod screws.

In accordance with an embodiment of the invention, each of the detectors faces an end of the corresponding one of the tilting arms and comprises a linear detector configured to optically detect the tilt amount of the corresponding one of the tilting arms.

Therefore, according to the laser surveying apparatus of the present invention, because the structure in which the inclination of the tilting mechanism of the laser projector is read directly in an opposed manner is employed, it is possible to set the accurate angle of inclination even when there is the play in the laser projector and its supporting mechanism. In addition, since the supporting mechanism in which the large angle of inclination can be obtained such as the gimbal supporting mechanism is possible to be employed, it is possible to widen the range of inclination of the laser projector.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

Figure 1:
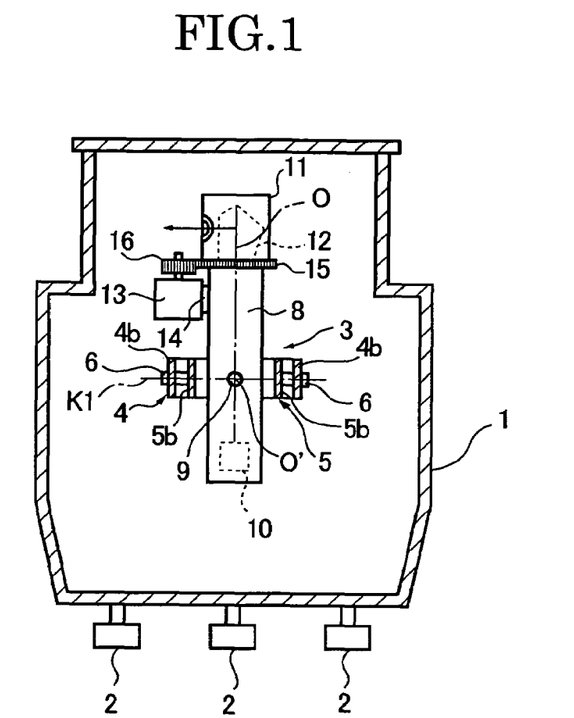
FIG. 1 is a partial cross-sectional side view illustrating a main part of a gimbal mechanism of a laser surveying apparatus according to an embodiment of the invention, in which a relation of supporting between the gimbal mechanism and a laser projector, seen from a direction perpendicular to an X-Z plane, is illustrated.

Referring to FIG. 1, a reference numeral 1 denotes a casing of a surveying apparatus. A lower part of the casing 1 is provided with leveling screws 2. The leveling screws 2 function to adjust the casing 1 to be placed horizontally.

Figure 2:
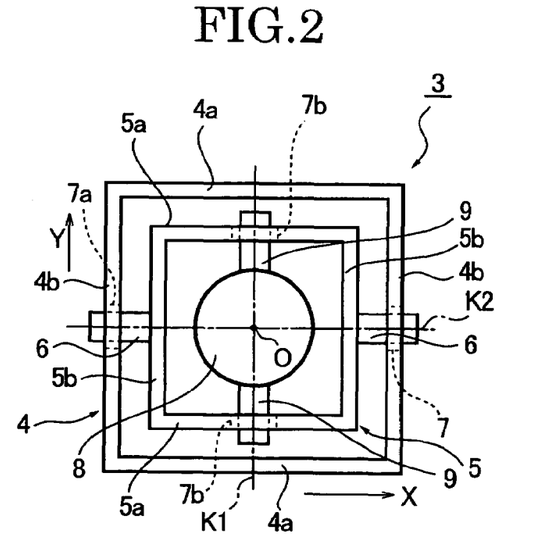
FIG. 2 is a plan view illustrating the relation of supporting between the gimbal mechanism and the laser projector illustrated in FIG. 1.

As illustrated in FIG. 2, inside of the casing 1 is provided with a gimbal mechanism 3. The gimbal mechanism 3 according to the present preferred embodiment of the invention is structured by a rectangular outer frame 4, and a rectangular inner frame 5 surrounded by the outer frame 4.

Referring to FIG. 2, the outer frame 4 includes a pair of parallel plates 4a extending in an X-direction, and a pair of parallel plates 4b extending in a Y-direction. The outer frame 4 is fixed to the casing 1. The inner frame 5 includes a pair of parallel plates 5a extending in the X-direction, and a pair of parallel plates 5b extending in the Y-direction.

The pair of parallel plates 5b of the inner frame 5 is protrudedly formed with a pair of shafts 6 each positioned symmetrical with an optical axis O (or a "Z"-direction) of a later-described laser projector as an axis of symmetry. Each of the shafts 6 extends in a direction opposite to each other in the X-direction. The shafts 6 are rotatably supported by the parallel plates 4b of the outer frame 4 through bearings, respectively. In the present preferred embodiment, a ball bearing 7a is used as the bearing, although it is not limited thereto.

The laser projector 8 is provided in the inner frame 5. The laser projector 8 is protrudedly formed with a pair of shafts 9 each positioned symmetrical with the optical axis O of the laser projector 8 as an axis of symmetry. Each of the shafts 9 extends in a direction opposite to each other in the Y-direction. The shafts 9 are rotatably supported by the parallel plates 5a of the inner frame 5 preferably through ball bearings 7b, respectively, although it is not limited thereto.

According to the present preferred embodiment, an intersection point of an axis line K2 connecting each of the shafts 6 and an axis line K1 connecting each of the shafts 9 is set as the center of tilt of the laser projector 8.

Turning to FIG. 1, a bottom part of the laser projector 8 is provided with a laser light source 10. An upper part of the laser projector 8 is provided with a rotation cylinder 11, which is provided rotatably. Inside of the rotation cylinder 11 is arranged with a pentaprism 12. In addition, an upper outer circumferential part of the laser projector 8 is attached with a drive motor 13 through a bracket 14. Moreover, a lower part of the rotation cylinder 11 is arranged with a gear 15, withwhich an output gear 16 of the drive motor 13 is engaged.

Figure 3:
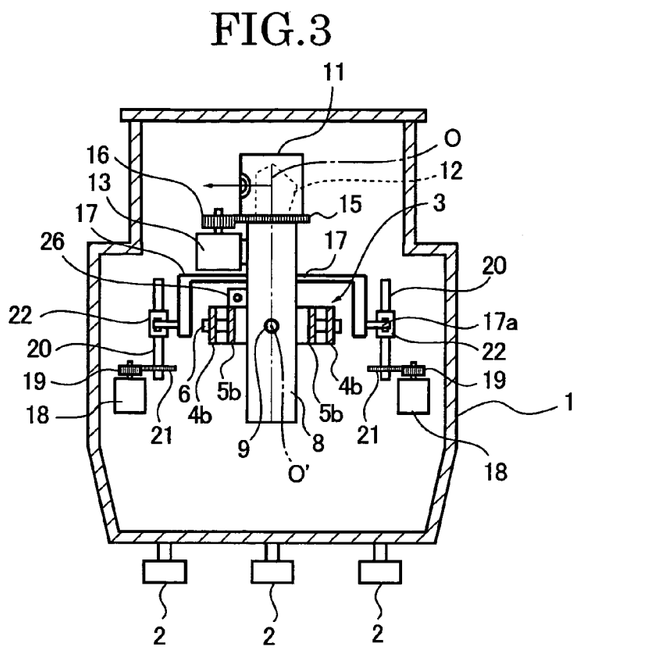
FIG. 3 is a partial cross-sectional view illustrating a relation among the gimbal mechanism, the laser projector illustrated in FIG. 1 and a tilting mechanism, seen from a direction perpendicular to the X-Z plane.
Figure 4:
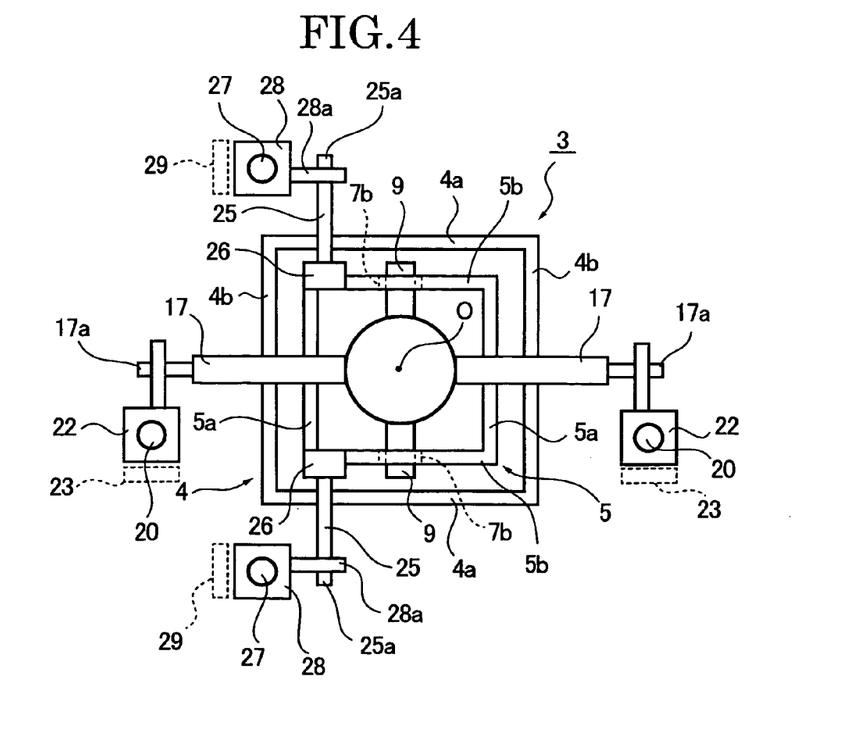
FIG. 4 is a view illustrating the relation among the gimbal mechanism, the laser projector and the tilting mechanism illustrated in FIG. 3, seen from the direction perpendicular to an X-Y plane.

As illustrated in FIGS. 3 and 4, the laser projector 8 is formed with a pair of tilting arms 17 each positioned symmetrical with the optical axis O of the laser projector 8 as an axis of symmetry, and each of the tilting arms 17 extends in a direction opposite to each other in the X-direction. Referring to FIG. 3, leading ends extending mutually in the opposite directions of the tilting arms 17 are bent downwardly preferably at a right angle, respectively, and lower ends in the bent-directions of the tilting arms 17 are arranged with engagement pins 17a each protruded in a direction opposite to each other, respectively. In the present preferred embodiment, the pair of tilting arms 17 structures a part of a Z-X in-plane tilting mechanism configured to tilt the laser projector 8 in the X-direction in a Z-X plane.

Figure 5:
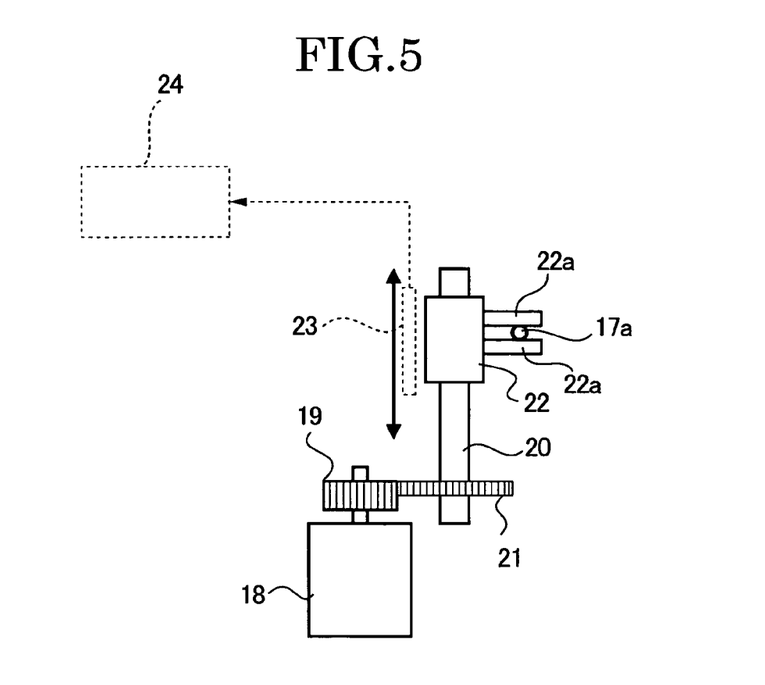
FIG. 5 is a view illustrating a driving section of the tilting mechanism illustrated in FIG. 3.

The Z-X in-plane tilting mechanism includes drive motors 18 each structure a part of a tilt driving section as illustrated in FIG. 5. The drive motors 18 are fixed to appropriate parts in the casing 1, and are provided with output gears 19, respectively.

Each rod screw 20 is provided rotatably and adjacent to the corresponding one of the drive motors 18 in the casing 1. Each of the rod screws 20 is provided with a rotation transmission gear 21, which is engaged with the corresponding output gear 19 of the drive motor 18. Each of the rod screws 20 is driven to rotate by the corresponding drive motor 18, and provided with a slider 22. The slider 22 reciprocates vertically by the rotation of the rod screw 20.

The slider 22 is arranged with a pair of engagement claws 22a vertically spaced as illustrated in FIG. 5. The pair of engagement claws 22a preferably has flexibility, and the engagement pin 17a of each of the tilting arms 17 is located between the pair of engagement claws 22a of the corresponding one of the sliders 22.

The engagement pins 17a and the pair of shafts 6 are preferably positioned in the same straight line. The laser projector 8 is tilted in the X-direction in the Z-X plane by the engagement of each of the engagement claws 22a and each of the engagement pins 17a.

Each linear detector 23 is provided and fixed in the casing 1 in such a manner as to face a range of the reciprocal movement of the corresponding one of the sliders 22. The linear detector 23 is used to optically detect a movement amount from a reference position (or a horizontal position) of the slider 22. Detection outputs of the sliders 22 outputted from the corresponding linear detectors 23 are inputted to an arithmetic section 24; functions of which will be described later.

Figure 6:
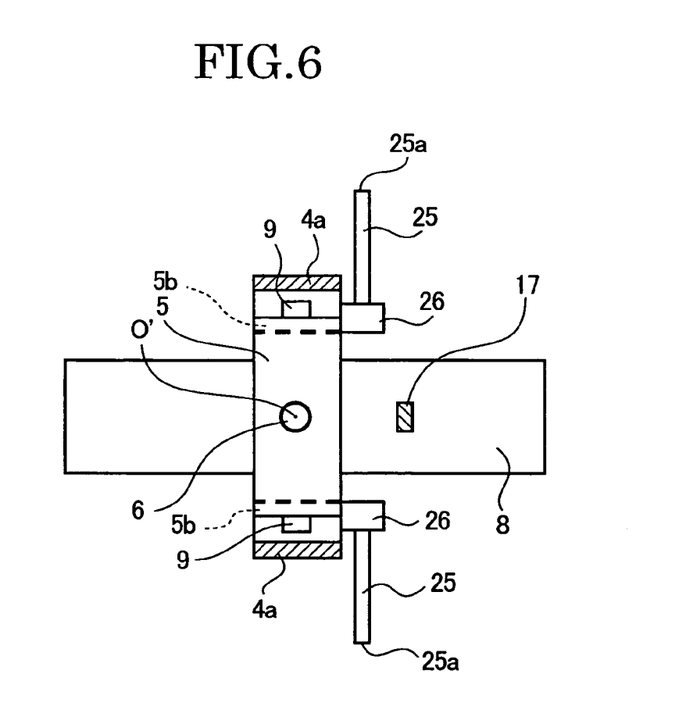
FIG. 6 is a view illustrating the relation among the gimbal mechanism, the laser projector and the tilting mechanism illustrated in FIG. 3, seen from the direction perpendicular to the Y-Z plane.

Referring to FIGS. 4 and 6, a pair of tilting arms 25, each extending in a direction opposite to each other in the Y-direction, are arranged to the parallel plates 5a of the inner frame 5. Reference numerals 26 denote fixed blocks for fixing and retaining one ends of the tilting arms 25, respectively. In the present preferred embodiment, the pair of tilting arms 25 structures a part of a Z-Y in-plane tilting mechanism configured to tilt the laser projector 8 in the Y-direction in a Z-Y plane.

A pair of rod screws 27 is provided rotatably in the casing 1, and each of the rod screws 27 includes a slider 28 provided vertically moveable. Each of the sliders 28 is arranged with a pair of engagement claws 28a which are vertically spaced. Engagement ends 25a of the tilting arms 25 are located between the pair of engagement claws 28a of the corresponding sliders 28, respectively. In the present preferred embodiment, drive motors, output gears and rotation transmission gears having the same structures as the drive motors 18, the output gears 19 and the rotation transmission gears 21 illustrated in FIG. 5 are used, respectively.

The laser projector 8 is tilted in the Y-direction in the Z-Y plane by the engagement of each of the engagement claws 28a and each of the engagement pins 25a. Each linear detector 29 is provided and fixed in the casing 1 in such a manner as to face a range of the reciprocal movement of the corresponding one of the sliders 28. The linear detector 28 is used to optically detect a movement amount from a reference position (or a horizontal position) of the slider 28. Detection outputs of the sliders 28 outputted from the corresponding linear detectors 29 are inputted to the arithmetic section 24.

When the laser projector 8 is to be tilted in the X-direction in the Z-X plane, for example, one of the sliders 22 is raised whereas the other of the sliders 22 is lowered. Accordingly, the movement amount or an amount of raising of one of the sliders 22 from the reference position is detected by the corresponding linear detector 23, while the movement amount or an amount of lowering of the other slider 22 from the reference position is detected by the corresponding linear detector 23.

Figure 7:
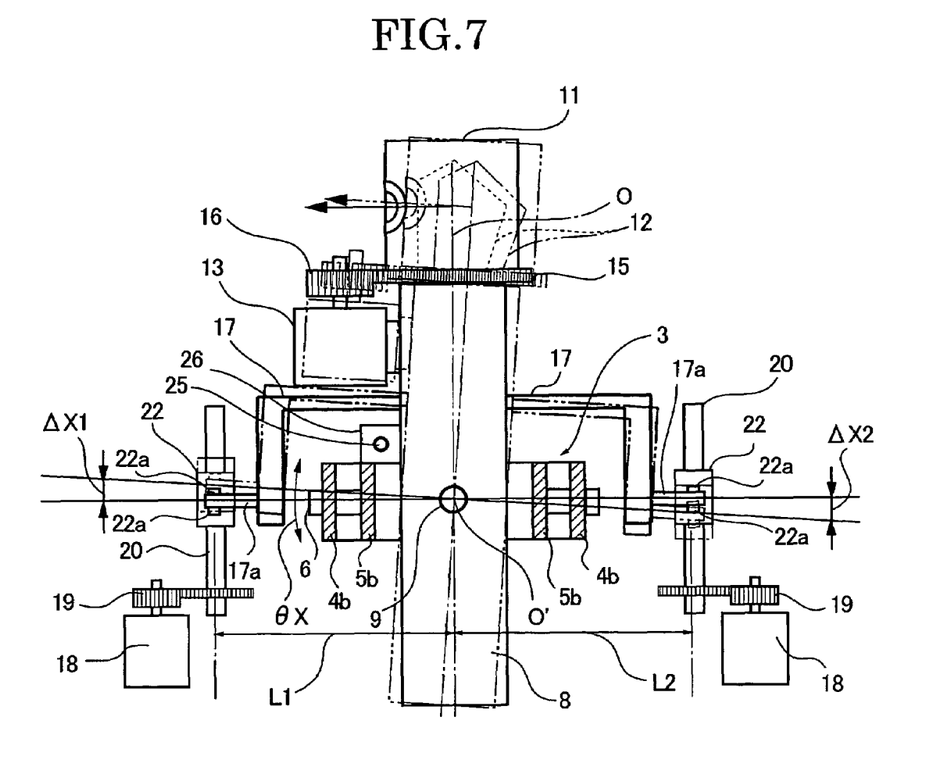
FIG. 7 is an explanatory view illustrating an example of calculation for obtaining a tilt angle of the laser projector illustrated in FIG. 1, and also illustrates a relation between distances from the center of tilt of the laser projector to rod screws in a horizontal direction and movement amounts of sliders.

As illustrated in FIG. 7, in the present preferred embodiment, when it is defined that distances from the center of tilt O' of the laser projector 8 to each of the central axes (or the sliders 22) of the rod screws 20 are L1 and L2, respectively, and the movement amounts in the X-axis directions of the sliders 22 of the both ends are $\Delta X1$ and $\Delta X2$, respectively, an angle of inclination $\theta X$ from a horizontal plane with respect to the X-direction is:

$$\theta X = \tan^{-1}((\Delta X1 + \Delta X2)/(L1 + L2))$$

Therefore, calculation of the angle of inclination is possible even when there is the play in a supporting mechanism.

In addition, when the laser projector 8 is to be tilted in the Y-direction in the Z-Y plane, for example, one of the sliders 28 is raised whereas the other of the sliders 28 is lowered. Accordingly, the movement amount or an amount of raising of one of the sliders 28 from the reference position is detected by the corresponding linear detector 29, while the movement amount or an amount of lowering of the other slider 28 from the reference position is detected by the corresponding linear detector 29. Then, the arithmetic section 24 obtains an angle of inclination from the horizontal plane with respect to the Y-direction from the detection outputs of the pair of linear detectors 29.

Therefore, according to the preferred embodiment of the invention, when the structure in which the laser projector 8 is tilted by utilizing the pairs of the tilting arms is utilized, it is possible to obtain a tilt angle having the angles of inclination of the laser projector 8 precisely, even when the supporting mechanism has the play.

In addition, when the laser projector 8 is tilted in the X-direction and the Y-direction relative to the horizontal plane at predetermined angles and the rotation cylinder 11 is rotated thereafter, it is possible to form a rotation reference plane or a reference plane having the angles $\theta X$ and $\theta Y$ relative to the horizontal plane.

As described in the foregoing, according to the present preferred embodiment, the tilting mechanism is arranged to one of the ends of each of the tilting arms. In an alternative embodiment of the invention, one of the ends of the pair of tilting arms includes only a tilt detecting mechanism configured to detect the movement amount of the slider, and the other of the ends of the pair of tilting arms includes the tilting mechanism. The alternative embodiment of the invention is also possible to set the inclination of the laser projector accurately and precisely.

The present application is based on and claims priority from Japanese Application Serial Number 2005-309526, filed Oct. 25, 2005, the disclosure of which is hereby incorporated by reference herein in its entirety.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present specification or during the prosecution of the application, which examples are to be construed as non-exclusive. For example, in the present disclosure, the term "preferably", "preferred" or the like is non-exclusive and means "preferably", but not limited to. Moreover, no element and component in the present disclosure is intended to be dedicated to the public regardless of whether the element or component is explicitly recited in the following claims.

What is claimed is:

1. A laser surveying apparatus, comprising:
   a laser light source configured to emit a laser light flux;
   a laser projector supported tiltably and configured to rotatably irradiate the laser light flux emitted from the laser light source;
   a mechanism tiltably supporting the laser projector;
   tilting arms extending in an X-direction and a Y-direction substantially perpendicular to the laser projector;
   a tilt driving section provided to at least one of the tilting arms configured to drive corresponding at least one of the tilting arms;
   detectors provided to each of the tilting arms and each configured to detect a movement amount of the corresponding one of the tilting arms, and
   an arithmetic section configured to calculate an inclination of the laser projector in the X-direction and the Y-direction from each of the movement amounts of the tilting arms detected by the corresponding detectors.

2. The laser surveying apparatus according to claim 1, wherein each of the detectors is configured to detect the movement amount of the corresponding one of the tilting arms by detecting a movement amount of the tilt driving section engaged with the at least one of the tilting arms.

3. The laser surveying apparatus according to claim 1, wherein the mechanism comprises a gimbal mechanism configured to tiltably support the laser projector, and wherein the arithmetic section is configured to detect an error caused by play of the gimbal mechanism from the movement amount of each of the tilting arms detected by the corresponding detectors.

4. The laser surveying apparatus according to claim 1,
wherein the mechanism comprises a gimbal mechanism configured to tiltably support the laser projector, and
the laser surveying apparatus further comprises:
a first pair of shafts each extending in directions opposite to each other in one of the X-direction and the Y-direction and configured to rotatably support a body of the gimbal mechanism, and
a second pair of shafts each extending in directions opposite to each other in the other of the X-direction and the Y-direction, and
wherein an intersection point of an axis line connecting each of the shafts of the first pair of shafts and an axis line connecting each of the shafts of the second pair of shafts is a center of tilt of the laser projector.

5. The laser surveying apparatus according to claim 4, wherein the second pair of shafts is protruded from the laser projector.

6. The laser surveying apparatus according to claim 1, wherein
the tilt driving section is provided to each of the tilting arms, and
wherein each of the tilt driving sections comprises:
a drive motor;
a rod screw driven by the drive motor; and
a slider engaged with the corresponding one of the tilting arms and configured to reciprocate by the rod screw in a direction to which the rod screw extends.

7. The laser surveying apparatus according to claim 6,
wherein each of the detectors faces corresponding one of the sliders of the tilt driving sections and comprises a linear detector configured to optically detect a movement amount of the corresponding one of the sliders.

8. The laser surveying apparatus according to claim 6, wherein the arithmetic section is configured to calculate a tilt angle from a horizontal plane of the laser projector based on the movement amount from a reference position of each of the sliders and distances from a center of tilt of the laser projector to each of the rod screws.

9. The laser surveying apparatus according to claim 1, wherein each of the detectors faces an end of the corresponding one of the tilting arms and comprises a linear detector configured to optically detect the movement amount of the corresponding one of the tilting arms.

10. A laser surveying apparatus, comprising:
a laser light source configured to emit a laser light flux;
a laser projector supported tiltably and configured to rotatably irradiate the laser light flux emitted from the laser light source to form a rotation reference plane;
a gimbal mechanism having a frame body and configured to tiltably support the laser projector in an X-direction and a Y-direction perpendicular to each other;
a casing accommodating therein the gimbal mechanism;
a first pair of shafts each extending from the frame body of the gimbal mechanism to the casing in directions opposite to each other in one of the X-direction and the Y-direction and configured to rotatably support the frame body of the gimbal mechanism, and
a second pair of shafts each extending from the frame body of the gimbal mechanism in directions opposite to each other in the other of the X-direction and the Y-direction and configured to support the laser projector,
a tilting mechanism provided in the casing and configured to tilt the laser projector; and
an arithmetic section configured to calculate a tilt angle of the laser projector,
the tilting mechanism including:
a first pair of tilting arms each extending in directions opposite to each other in the X-direction from the laser projector;
a second pair of tilting arms each extending in directions opposite to each other in the Y-direction from the laser projector;
first tilt driving sections each configured to drive corresponding one of the tilting arms of the first pair of tilting arms;
second tilt driving sections each configured to drive corresponding one of the tilting arms of the second pair of tilting arms;
first detectors each configured to detect a tilt amount of the corresponding one of the tilting arms of the first pair of tilting arms; and
second detectors each configured to detect a tilt amount of the corresponding one of the tilting arms of the second pair of tilting arms,
the arithmetic section being configured to calculate the tilt angle of the laser projector according to an output of detection of the tilt amount of each of the first detectors and the second detectors.

11. The laser surveying apparatus according to claim 10,
wherein an intersection point of an axis line connecting each of the shafts of the first pair of shafts and an axis line connecting each of the shafts of the second pair of shafts is a center of tilt of the laser projector.

12. The laser surveying apparatus according to claim 10, wherein each of the tilt driving sections comprises:
a drive motor;
a rod screw driven by the drive motor; and
a slider engaged with the corresponding one of the tilting arms and configured to reciprocate by the rod screw in a direction to which the rod screw extends.

13. The laser surveying apparatus according to claim 12,
wherein each of the detectors faces the corresponding one of the sliders of the tilt driving sections and comprises a linear detector configured to optically detect a movement amount of the corresponding one of the sliders.

14. The laser surveying apparatus according to claim 13, wherein the arithmetic section is configured to calculate the tilt angle from a horizontal plane of the laser projector based on the movement amount from a reference position of each of the sliders and distances from a center of tilt of the laser projector to each of the rod screws.

15. The laser surveying apparatus according to claim 10, wherein each of the detectors faces an end of the corresponding one of the tilting arms and comprises a linear detector configured to optically detect the tilt amount of the corresponding one of the tilting arms.

* * * * *